United States Patent
Sharifi Mehr

(10) Patent No.: US 10,374,800 B1
(45) Date of Patent: Aug. 6, 2019

(54) CRYPTOGRAPHY ALGORITHM HOPPING

(71) Applicant: Amazon Technologies, Inc., Reno, NV (US)

(72) Inventor: Nima Sharifi Mehr, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/483,070

(22) Filed: Sep. 10, 2014

(51) Int. Cl.
*H04L 9/14* (2006.01)

(52) U.S. Cl.
CPC ..................................... *H04L 9/14* (2013.01)

(58) Field of Classification Search
USPC .......................................................... 380/28
See application file for complete search history.

(56) References Cited

U.S. PATENT DOCUMENTS

| | | | |
|---|---|---|---|
| 6,094,485 A | 7/2000 | Weinstein et al. | |
| 6,125,446 A | 9/2000 | Olarig et al. | |
| 6,487,293 B2* | 11/2002 | Sako | G11B 20/00086 369/47.1 |
| 6,633,980 B1* | 10/2003 | Johnson | H04L 63/068 713/168 |
| 7,010,681 B1 | 3/2006 | Fletcher et al. | |
| 7,219,223 B1* | 5/2007 | Bacchus | H04L 63/0428 713/150 |
| 7,428,306 B2* | 9/2008 | Celikkan | G06F 21/602 380/28 |
| 8,590,027 B2 | 11/2013 | Rowley | |
| 8,966,267 B1 | 2/2015 | Pahl et al. | |
| 9,531,705 B1* | 12/2016 | Mehner | H04L 63/0823 |
| 2002/0023010 A1* | 2/2002 | Rittmaster | G06Q 30/0261 705/26.1 |
| 2002/0095594 A1* | 7/2002 | Dellmo | G06F 21/602 726/26 |
| 2002/0099858 A1 | 7/2002 | Lindo et al. | |
| 2003/0048905 A1 | 3/2003 | Gehring et al. | |
| 2003/0226017 A1* | 12/2003 | Palekar | H04L 63/0428 713/168 |

(Continued)

FOREIGN PATENT DOCUMENTS

| | | | |
|---|---|---|---|
| CN | 1503504 | 6/2004 | |
| EP | 1372119 A1 * | 12/2003 | ........... G06Q 20/341 |
| WO | WO2012134218 | 10/2012 | |

OTHER PUBLICATIONS

Carvalho et al., "Moving-Target Defenses for Computer Networks," Florida Institute of Technology, Copublished by the IEEE Computer and Reliability Societies, Mar./Apr. 2014, pp. 73-76.

(Continued)

*Primary Examiner* — Farid Homayounmehr
*Assistant Examiner* — Thanh T Le
(74) *Attorney, Agent, or Firm* — Davis Wright Tremaine LLP

(57) ABSTRACT

A cryptography algorithm hopping model is used to enable computer systems communicating with one another to vary the cryptographic algorithms used for the communications. The cryptography algorithm hopping model specifies a plurality of cryptography algorithms and information sufficient to determine a sequence of the plurality of cryptography algorithms and to determine when to switch from a cryptography algorithm in the sequence to a next cryptography algorithm in the sequence.

20 Claims, 10 Drawing Sheets

(56) References Cited

U.S. PATENT DOCUMENTS

| | | | |
|---|---|---|---|
| 2004/0030896 A1* | 2/2004 | Sakamura | G06Q 20/341 713/169 |
| 2004/0123159 A1* | 6/2004 | Kerstens | H04L 29/06 726/12 |
| 2005/0188193 A1 | 8/2005 | Kuehnel et al. | |
| 2006/0041938 A1* | 2/2006 | Ali | G06Q 20/341 726/14 |
| 2006/0045273 A1* | 3/2006 | Mayer | H04L 9/12 380/277 |
| 2006/0098814 A1* | 5/2006 | Al-Khoraidly | G06F 7/725 380/28 |
| 2006/0191002 A1 | 8/2006 | Lee et al. | |
| 2007/0042769 A1 | 2/2007 | Thommana et al. | |
| 2007/0154018 A1 | 7/2007 | Watanabe | |
| 2007/0180130 A1* | 8/2007 | Arnold | H04L 69/18 709/230 |
| 2007/0297430 A1 | 12/2007 | Nykanen et al. | |
| 2008/0063192 A1* | 3/2008 | Goubin | G06F 21/556 380/46 |
| 2008/0070571 A1 | 3/2008 | Nguyen et al. | |
| 2008/0072034 A1 | 3/2008 | Lescuyer et al. | |
| 2008/0123859 A1* | 5/2008 | Mamidwar | H04L 9/0625 380/278 |
| 2008/0126813 A1 | 5/2008 | Kawakami | |
| 2008/0130518 A1 | 6/2008 | Nishikata et al. | |
| 2008/0141313 A1* | 6/2008 | Kato | H04N 7/1675 725/62 |
| 2008/0178240 A1 | 7/2008 | Ikeda et al. | |
| 2008/0313310 A1* | 12/2008 | Vasa | H04L 67/34 709/219 |
| 2009/0059915 A1 | 3/2009 | Baker | |
| 2009/0119503 A1* | 5/2009 | Isaakian | G06F 21/572 713/153 |
| 2009/0276830 A1 | 11/2009 | O'Connor | |
| 2009/0296938 A1 | 12/2009 | Devanand et al. | |
| 2010/0278338 A1* | 11/2010 | Chang | G09C 1/00 380/200 |
| 2010/0306525 A1* | 12/2010 | Ferguson | H04L 63/0442 713/151 |
| 2011/0093710 A1* | 4/2011 | Galvin | H04L 63/061 713/169 |
| 2011/0113244 A1* | 5/2011 | Chou | H04L 63/166 713/168 |
| 2011/0150223 A1* | 6/2011 | Qi | H04W 12/04 380/273 |
| 2011/0252227 A1* | 10/2011 | Strong | G06F 21/445 713/151 |
| 2011/0280406 A1 | 11/2011 | Ma et al. | |
| 2012/0077461 A1 | 3/2012 | Das et al. | |
| 2013/0007434 A1 | 1/2013 | King et al. | |
| 2014/0012674 A1* | 1/2014 | Piccionielli | H01M 8/0662 705/14.55 |
| 2014/0013101 A1 | 1/2014 | Tanizawa et al. | |
| 2014/0013420 A1* | 1/2014 | Picionielli | G06F 21/88 726/17 |
| 2014/0067996 A1 | 3/2014 | Zhang | |
| 2014/0164768 A1* | 6/2014 | Kruglick | H04L 63/062 713/168 |
| 2014/0304415 A1* | 10/2014 | Prakash | H04L 47/70 709/226 |
| 2015/0058913 A1 | 2/2015 | Kandasamy et al. | |
| 2015/0113172 A1 | 4/2015 | Johnson et al. | |
| 2015/0113277 A1* | 4/2015 | Harkins | H04L 9/083 713/171 |
| 2015/0288514 A1* | 10/2015 | Pahl | H04L 9/085 713/171 |
| 2015/0303964 A1 | 10/2015 | Shriya et al. | |
| 2015/0341317 A1 | 11/2015 | Zombik | |
| 2015/0382189 A1 | 12/2015 | Zhang et al. | |
| 2016/0021110 A1 | 1/2016 | Sugano | |
| 2016/0080940 A1* | 3/2016 | Pang | H04W 4/80 455/411 |

OTHER PUBLICATIONS

Chown et al., "Advanced Ecryption Standard (AES) Ciphersuites for Transport Layer Security (TLS)," The Internet Society, Network Working Group Request for Comments: 3268, Category: Standards Track, Jun. 2002, 7 pages.

Dierks et al., "The TLS Protocol: Version 1.0," The Internet Society, Network Working Group Request for Comments: 2246, Category: Standards Track, Jan. 1999, 80 pages.

Dierks et al., "The Transport Layer Security (TLS) Protocol: Version 1.2," Network Working Group Request for Comments: 5246, Category: Standards Track, Aug. 2008, 104 pages.

Eronen et al., "Pre-Shared Key Ciphersuites for Transport Layer Security (TLS)," The Internet Society, Network Working Group Request for Comments: 4279, Cateogry: Standards Track, Dec. 2005, 15 pages.

Glenn et al., "The NULL Encryption Algorithm and Its Use With IPsec," Internet Engineering Task Force (IETF) Request for Comments: 2410, Category: Standards Track, Nov. 1998, 6 pages.

Turner et al., "Prohibiting Secure Sockets Layer (SSL) Version 2.0," IETF Trust, Internet Engineering Task Force (IETF) Request for Comments: 6176, Mar. 2011, 4 pages.

* cited by examiner

CRYPTOGRAPHY ALGORITHM HOPPING

BACKGROUND

The security of computing resources and associated data is of high importance in many contexts. As an example, organizations often utilize networks of computing devices to provide a robust set of services to their users. Networks often span multiple geographic boundaries and often connect with other networks. An organization, for example, may support its operations using both internal networks of computing resources and computing resources managed by others. Computers of the organization, for instance, may communicate with computers of other organizations to access and/or provide data while using services of another organization. In many instances, organizations configure and operate remote networks using hardware managed by other organizations, thereby reducing infrastructure costs and achieving other advantages. With such configurations of computing resources, ensuring that access to the resources and the security of the data they hold can be challenging, especially as the size and complexity of such configurations grow.

Many techniques have been developed to enhance data security. For example, Transport Layer Security (TLS) and other protocols allow secure communications over a network between computer systems using symmetric cryptographic keys. Such protocols, however, often involve plaintext communications to establish a secure channel. As a result, access to the plaintext communications can provide some information about the secure channel that has been established. While the communications channels are still relatively secure, plaintext information about the communications channels can facilitate the exploitation of known weaknesses in various implementations of cryptographic protocols.

BRIEF DESCRIPTION OF THE DRAWINGS

Various embodiments in accordance with the present disclosure will be described with reference to the drawings, in which.

DETAILED DESCRIPTION

Figure 1:
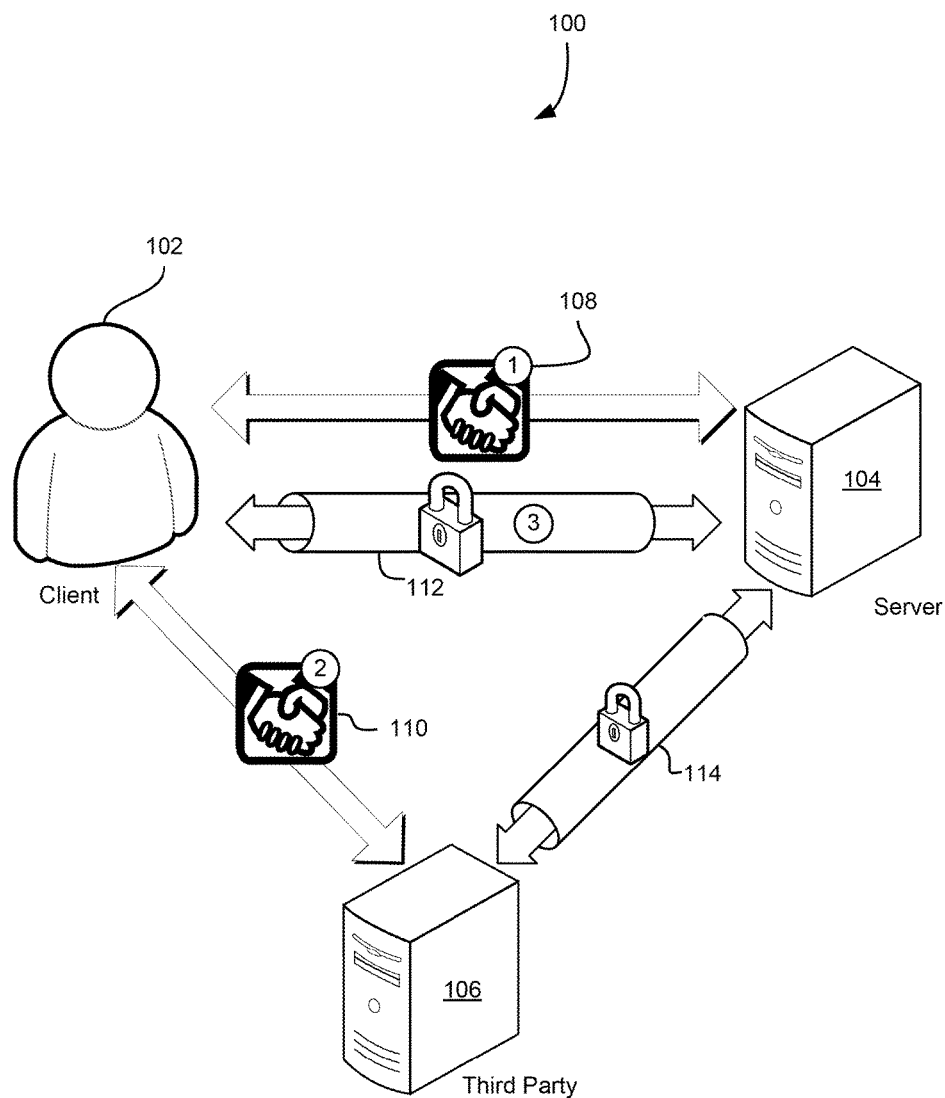
FIG. 1 shows an illustrative example of an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein enhance the security of communications over secure channels by increasing the difficulty of obtaining plaintext information about the secure channels. Specifically, the techniques described and suggested herein limit the usefulness of any information gained about a secure channel by enabling parties to securely switch to a new secure channel about which plaintext information has lower availability. In some examples, a client and server negotiate a secure communications channel, such as by performing a Transport Layer Security (TLS) handshake. Once the secure communications channel has been established, details about a new secure communications channel may be communicated to the client and server by a third party computer system (referred to, succinctly, as a "third party"). Once both the client and server have received details about the new secure channel from the third party, the client and server may establish the new secure channel for further communications. In this manner, an advantage to data security is achieved since, to obtain information about the second channel, potential attackers would need access to communications with the third party as well as communications between the client and server, which is substantially more difficult to obtain than access to communications between a single pair of parties.

These and other technical advantages are achieved in a wide variety of embodiments. In some examples, the server selects a third party from multiple third parties that are available to use. The server then may, over the secure channel that has been established, communicate the identity of the selected third party to the client. Both the client and the server can obtain parameters for a new encrypted channel from the third party and use those parameters to initiate a new secure channel between the client and server without having to communicate the parameters over the initial secure channel or in plaintext form. In some embodiments, the server has a virtual private network (VPN) or other secure connection to the third party. The client may perform a handshake process with the third party to establish a secure channel over which the parameters can be communicated to the client.

In some embodiments, the server selects the third party in a manner that further enhances data security. For example, in some embodiments, a geographic location of the server, third party, and/or client may be taken into account for the selection. In this manner, the probability of a potential attacker being able to physically access two out of the three entities to determine how to decrypt data encrypted over the new secure channel is substantially reduced. As another example, in some embodiments, the third party is selected as having an ability to communicate with the client over a short-range communication channel and/or over a local area network in which the client is located but which the server is not located. In this manner, the probability of a potential attacker being able to intercept communications from the client to the third party is greatly reduced, since such interceptions would generally require geographic proximity to the client.

The techniques described and suggested herein also provide further security enhancements through varying use of different cryptographic algorithms. In some embodiments, a client and server share a cryptography algorithm hopping model that indicates to both the client and the server how to move among cryptographic algorithms over time. The cryptography algorithm hopping model (hopping model) may take various forms in accordance with various embodiments. Generally, the hopping model describes parameters for a cryptography algorithm hopping algorithm (hopping algorithm), which is an algorithm for changing cryptographic algorithms. A cryptography algorithm hopping model may specify a plurality of cryptography algorithms and information sufficient to determine a sequence of the plurality of cryptography algorithms and to determine when to switch from one cryptography algorithm in the sequence to the next cryptography algorithm in the sequence, such as described below. In some examples, the hopping model is configured such that switches between cryptographic algorithms occur in fixed or variable time intervals. As another example, the switches between cryptographic algorithms may be based at least in part on the content of transferred messages or other contextual data (such as the number of messages transferred or the time of transfer). In some embodiments, the hopping model specifies one of multiple hopping algorithms that are available for use. In some embodiments, a cryptography algorithm hopping model references one or more other cryptography algorithm hopping models, thereby causing the model to cause cryptography algorithm hopping by causing hopping among a plurality of cryptography algorithm hopping models.

The mechanism by which the client and server communicate a hopping model varies in accordance with various embodiments. In some examples, the hopping model is communicated offline or through a different communication channel. In some embodiments, the hopping model is negotiated over a secure channel after an initial handshake protocol is completed to establish the secure channel. As yet another example, the hopping model may be negotiated during a handshake using a model identifier that references a pre-shared secret hopping model. Other variations are also considered as being within the scope of the present disclosure including, but not limited to, variations discussed below.

FIG. 1 shows an illustrative example of an environment in which various embodiments can be implemented. In this example, the environment 100 includes a client 102, a server 104 and a third party computer system 106. In an embodiment, the client 102 is a computer system such as a notebook or desktop computer, a tablet computing device, electronic book reader, mobile device, or other type of computing device including those enumerated below. The client 102 may operate in accordance with a client application such as a browser, mobile application, or other set of executable instructions that cause the client 102 to communicate with the server 104 and the third party 106 such as described in more detail below.

The server 104 may be a server computer system and may include one or more server applications. Similarly, the third party computer system 106 may be a server computer system such as the server computer system 104. It should be noted that the third party 106 may be a third party to the communications between the client 102 and server 104, and that the third party is not necessarily controlled, managed, hosted, or otherwise operated by an entity different than an entity that operates the client and/or an entity that operates the server 104. Generally, some or all of the entities illustrated in FIG. 1 may be operated by, owned by, and/or hosted by the same party.

The client 102, server 104, and third party 106 may communicate over a network such as the Internet. It should be noted that various types of communications in various types of networks, including those discussed below, may also be used. For example, in some embodiments, communications between a pair of entities shown in FIG. 1 occur over a public communications network such as the Internet, and communications between another pair of entities in the environment 100 illustrated in FIG. 1 occur over another channel, such as a local area network or use a short-range communications protocol to establish a short-range communication channel. The short-range communication channel may be established using various technologies, such as induction wireless, infrared wireless (such as technologies operating according to specifications and protocols provided by the Infrared Data Association or IrDA), or ultra wideband formats. In some embodiments, the first and second devices may utilize short-range, low-power, and high-frequency radio transmissions, such as Bluetooth®. In still other embodiments, the first and second devices may support acoustic-based data transfer. For example, the second device may include software components and a speaker that enable the second device to broadcast data to the first device as sound waves, while the first device may include software components and microphone that enable the second device to receive the data embedded in the sound waves. Thus, one or more of radio signal-based data transfer (e.g., near field communication (NFC) or Bluetooth®), light-based data transfer (e.g., infrared data transfer), an acoustic-based data transfer (e.g., sound wave-embedded data), or magnetic field-based transfer (e.g., reading data from a magnetic stripe) may be used for inter-device communication. The protocols and components for enabling computing devices to perform the systems and methods of the present disclosure by using such mechanisms for inter-device communication are well known to those skilled in the art of computer communications and thus, need not be described in more detail herein. Generally, embodiments described herein are not limited to those explicitly illustrated herein.

Turning to aspects of the present disclosure illustrated in FIG. 1, in an embodiment the client 102 performs a handshake process 108 with the server 104. In some embodiments the handshake process 108 is in accordance with the TLS protocol such as defined in Request for Comments (RFC) 5246, RFC 2246, RFC 4279, and RFC 6176, which are incorporated herein by reference. Other protocols such as secure sockets layer (SSL) and other protocols implemented below the application layer of the Open Systems Interconnect (OSI) model may also be used and/or adapted to utilize techniques described herein. The handshake process 108 may be used by the client 102 and the server 104 to negotiate a set of security parameters (referred to briefly as "security parameters) for establishment of a secure channel over which communications may be encrypted. It should be noted that the techniques described herein are adaptable to other protocols such as the Real Time Messaging Protocol (RTMP), the Point-to-Point Tunneling Protocol (PPTP), the Layer 2 Tunneling Protocol, various virtual private network (VPN) protocols, and other protocols, such as protocols for secure communication that include a handshake.

Performance of the handshake process 108 may enable the client 102 to transmit encrypted communications that are decryptable by the server 104 and similarly may enable the server 104 to encrypt communications to the client 102 that are decryptable by the client 102. Once the handshake process 108 has been completed, the client and server may communicate with one another securely (i.e., by each entity encrypting messages so as to be decryptable by the other entity but not decryptable to other entities). In an embodiment, one or more communications transmitted over a secure communications channel established using the handshake 108 include a notification from the server 104 to the client 102 to contact the third party 106. A secure communications channel may have a mode of communication between two (or among more than two) computer systems where each entity is operable to encrypt messages such that another entity to which the encrypted messages are transmitted is operable to decrypt the messages. An example secure communications channel is a TLS session negotiated using a TLS handshake. While various examples of the present disclosure use pairs of devices communicating with one another for the purpose of illustration, secure communications channels may be established in groups of devices where the number of devices is greater than two. The techniques described herein may thusly be adapted by providing the entities the information that enables employment of techniques described herein.

As discussed in more detail below, the server 104 may provide to the client 102 information that enables the client 102 to contact the third party 106. The information may include, for instance, an identifier of the third party 106 such as a network address, which may be an Internet protocol (IP) address of the third party 106 or a referral thereto. For example, in some embodiments the server 104 sends to the client 102 a uniform resource locator (URL) that can be used by the client 102 to communicate with a domain name service (DNS) to obtain a network address of the third party 106.

Once the client 102 has been instructed or otherwise notified by the server 104 to contact the third party 106, the client 102 may initiate a handshake 110 with the third party 106. The handshake 110 may be performed using a handshake process in accordance with a handshake protocol of a secure communications protocol, such as TLS, or by using another protocol. Once the third party 106 has completed the handshake process 110 with the client 102, the third party 106 may communicate security parameters for a secure channel to be established between the client 102 and the server 104. The security parameters communicated by the third party 106 to the client 102 over a secure communication channel established using the handshake process 110 may enable the client 102 to communicate over a new secure channel 112 with the server 104. The security parameters provided by the third party 106 to the client 102, for example, may include one or more cryptographic keys usable by the client for the secure channel 112. The security parameters may also include information from which the client 102 may derive cryptographic keys for use in communicating over the secure channel 112. Generally the security parameters provided by the third party 106 to the client 102 may include information that enables the client 102 to communicate over the secure channel 112 with the server 104 without having to negotiate parameters of the secure channel with the server 104. For instance, the security parameters may include cryptographic material (a set of cryptographic keys and/or information from which a set of cryptographic key may be derived) that enables the client to communicate with the server over a secure channel without having to perform a cryptographic key exchange with the server. A cryptographic key exchange may be a process by which information is securely shared between two entities to enable each entity to encrypt communications to be decryptable by the other entity without an encryption key being transmitted in plaintext form from one system to the other.

To enable the server 104 to communicate with the client 102 over the secure channel 112 the server 104 may receive the same or different security parameters from the third party 106. Whether the security parameters are the same or different may depend on the specific cryptographic algorithms being used for communication over the secure channel 112. For example, in some embodiments, both the client 102 and server 104 receive a symmetric cryptographic key for encrypting communications over the secure channel 112 or information from which the symmetric cryptographic key can be derived using information shared by the client 102 and the server 104. The security parameters may be different, for example, when asymmetric cryptographic algorithms are used by the client 102 and server 104 for communication over the secure channel 112. In some embodiments, for example, the third party 106 provides to the client 102 a certificate corresponding to a private key held as a secret by the server 104 or provided to the server 104 by the third party 106. The certificate may be used by the client 102 to obtain a public key that is usable to encrypt communications to the server 104 or information to enable encryption over the channel, such as a symmetric cryptographic key provided by the third party 106 or generated by the client 102.

In some embodiments, the server 104 maintains a secure connection 114 with the third party 106, such as a VPN connection. However, in other embodiments, the server 104 may perform a handshake process with the third party 106 for the purpose of establishing a secure channel over which the security parameters may be provided by the third party 106 to the server 104.

Numerous variations of the example embodiment shown in FIG. 1 are considered as being within the scope of the present disclosure. For example, while a client and server relationship is used for the purpose of illustration, the techniques discussed herein may be used generally to enable communications between computer systems, regardless of whether those computer systems are classified as clients or servers. As another example, communications between the client 102 and the third party 106 may occur in various ways which may or may not involve a handshake. For example, the client 102 may have a physical communications connection to the third party 106 and as a result a handshake process may not be required for the purposes of establishing a secure channel between the client 102 and the third party 106. As another example, as noted above, communications between the client 102 and the third party 106 may occur over short-range communication. Communications between the client 102 and the third party 106 may or may not be encrypted. As other examples of variations considered as being within the scope of the present disclosure, communications between the third party 106 and server 104 may vary in accordance with various embodiments, including in ways discussed above in connection with communications between the client 102 and the third party 106.

As yet another example, the client 102 may select a third party and notify the server 104 of the selection. In some examples, the client 102 and server 104 negotiate selection of the third party by the client or server selecting from the intersection of sets of third parties respectively authorized and/or available to the client and server, respectively. One entity may present a list of authorized and/or available third parties and the other entity may select from the present lest based at least in part on a list of third parties that the other entity authorizes and/or has available.

In addition to the above, other variations considered as being within the scope of the present disclosure include variations involving communication with the third party 106 by either the client 102 or the server 104, or both. For example, in some embodiments, techniques described herein for establishing a secure communications channel between the client 102 and server 104 may also be used to establish a secure communications channel between the client and/or server and the third party. In other words, a secure communications channel may be established between a client/server and a third party by involving a third party to the pair of entities communicating. Generally, any establishment of a secure communications channel between two computing entities (e.g., client, server, and third party) may utilize a third party in accordance with embodiments described herein. As a result, between two computing entities, the establishment of a secure communications channel may involve multiple third parties depending on which secure communications channels are established using a third party to a pair of computing entities.

Figure 2:
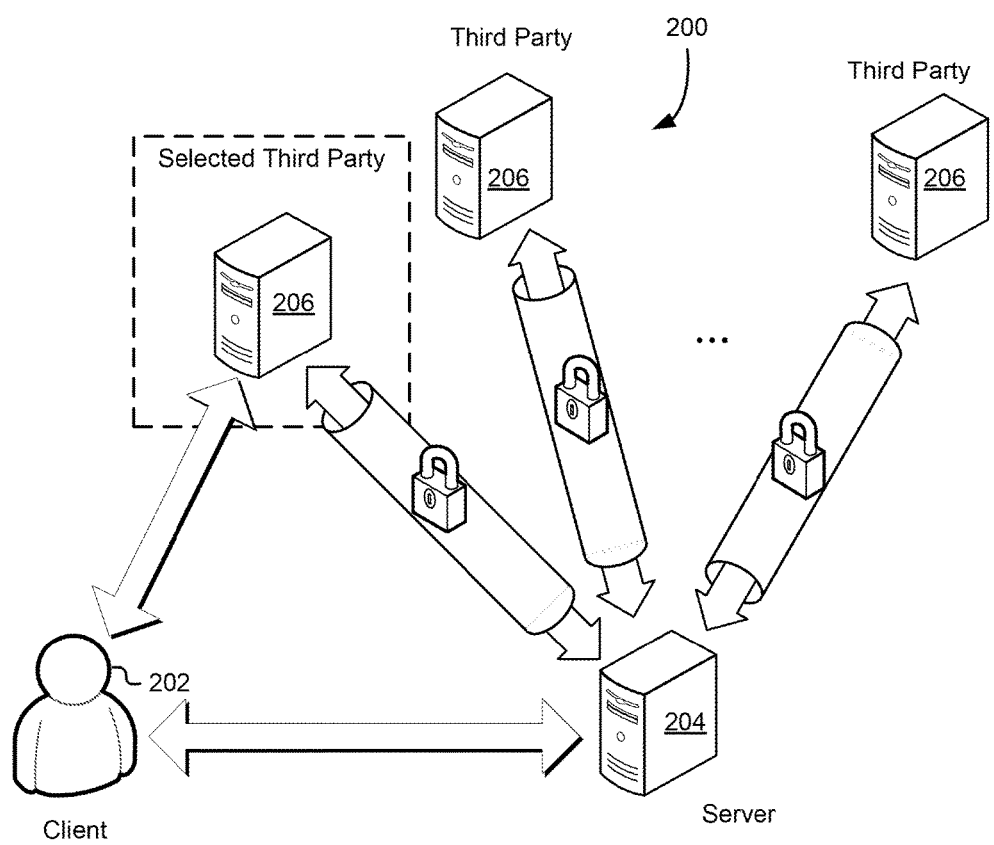
FIG. 2 shows an illustrative example of an environment in which various embodiments can be implemented.

FIG. 2 shows an illustrative example of an environment 200 in which various embodiments can be implemented. In an embodiment, the environment 200 includes a client 202 and a server 204. The client 202 and the server 204 may be client and server such as described above. As illustrated in FIG. 2, the environment 200 includes a plurality of third parties 206. Each third party 206 may be a third party such as described above in connection with FIG. 1. The plurality of third parties may be servers that the server 204 is able to communicate with. As illustrated in FIG. 2, in order to communicate with the client 202 one of the third parties 206 may be a selected third party which may be selected by the client 202 or the server 204.

The third party may be selected from the plurality of third parties 206 in various ways in accordance with various embodiments. In some examples, the third party is selected by a random or other process, such as a round robin process. As noted above in other examples, the third party may be selected due to one or more characteristics of the third party. In some embodiments, the third party is selected based at least in part on a geographic location. As an example, the third party 206 may be selected as a result of the client 202 having an ability to communicate with the third party over a local area network and/or using short-range communications. In some embodiments, the client 202 may have an associated registration of one or more devices capable of operating as a third party in accordance with the techniques described herein. As an illustrative example, the client 202 may have an account with a service provider that operates the server 204. The service provider may maintain a database that associates accounts with devices capable of operating as third parties. For instance, a device capable of operating as a third party may be a mobile device or tablet computing device having an application installed that enables the device to operate as a third party. When a need to utilize a third party is detected by the server 204, the server 204 may query the database to determine a device different from the client 202 capable of operating as a third party. Other example devices that may be registered with an account include set top boxes, wearable computing devices, such as smart watches, and others. As yet another example, a third party may be an application running on the same device as the client 202. Such a third party may, for example, be executed within a secure, hardware-protected execution environment, such as a trusted platform module (TPM), or in an enclave of a processor supporting Secure Guard Extension (SGX) functionality from Intel Corp.

A selection of a third party may also be made based at least in part by a state of a device capable of operating as a third party. For instance, various devices associated with a user, such as mobile devices and tablet computing devices, may have intermittent network connectivity and may often be in a powered-off state. The server 204 (or client 202) may determine which devices are capable of operating as a third party based at least in part on current states of those devices such as whether those devices are connected to a network and/or in a powered-on state. Determination of the state of the devices may be made, for example, by transmitting communications to those devices and identifying devices that respond as being capable of operating as third parties.

As another illustrative example, a device associated with an account and capable of operating as a third party may be a router or other piece of networking equipment registered with the account. As yet another example, a geographic location of the client 202 may be used to select a device capable of operating as a third party. For instance, the client 202 may be a mobile device such as a mobile phone or a tablet computing device with a global positioning system (GPS) or other mechanism from which a location of the client 202 may be determined. As part of communicating with the server 204, the client 202 may transmit information indicative of the client's location. The server 204 may select a device capable of operating as a third party based at least in part on the location provided by the client 202. If, for example, the location of the client 202 is determined as being within a particular business, such as a coffee shop, the server 204 may cause a router or other device in the coffee shop to be selected as a third party. In some examples a device selected as capable of operating as a third party may be a beacon device that transmits information to the client 202 using a sound-based or other protocol. In various embodiments where the device capable of operating as a third party is selected as a device accessible to a user of the client 202, a user interface may indicate to the user to perform one or more operations on the selected device to enable security parameters to be provided to the client 202, either by input from the user or in an automated fashion. However, in some embodiments the transfer of information from the selected third party to the client 202 may be completely automated.

As illustrated in FIG. 2, the server 204 may maintain persistent secure connections (e.g., VPN connections) with a plurality of third parties 206 for the purpose of obtaining information from the third parties 206 without the need of synchronously negotiating secure channels. The server 204 may use different third parties for different clients and may use the same third party to obtain security parameters for multiple different customers, each with a corresponding set of security parameters.

Figure 3:
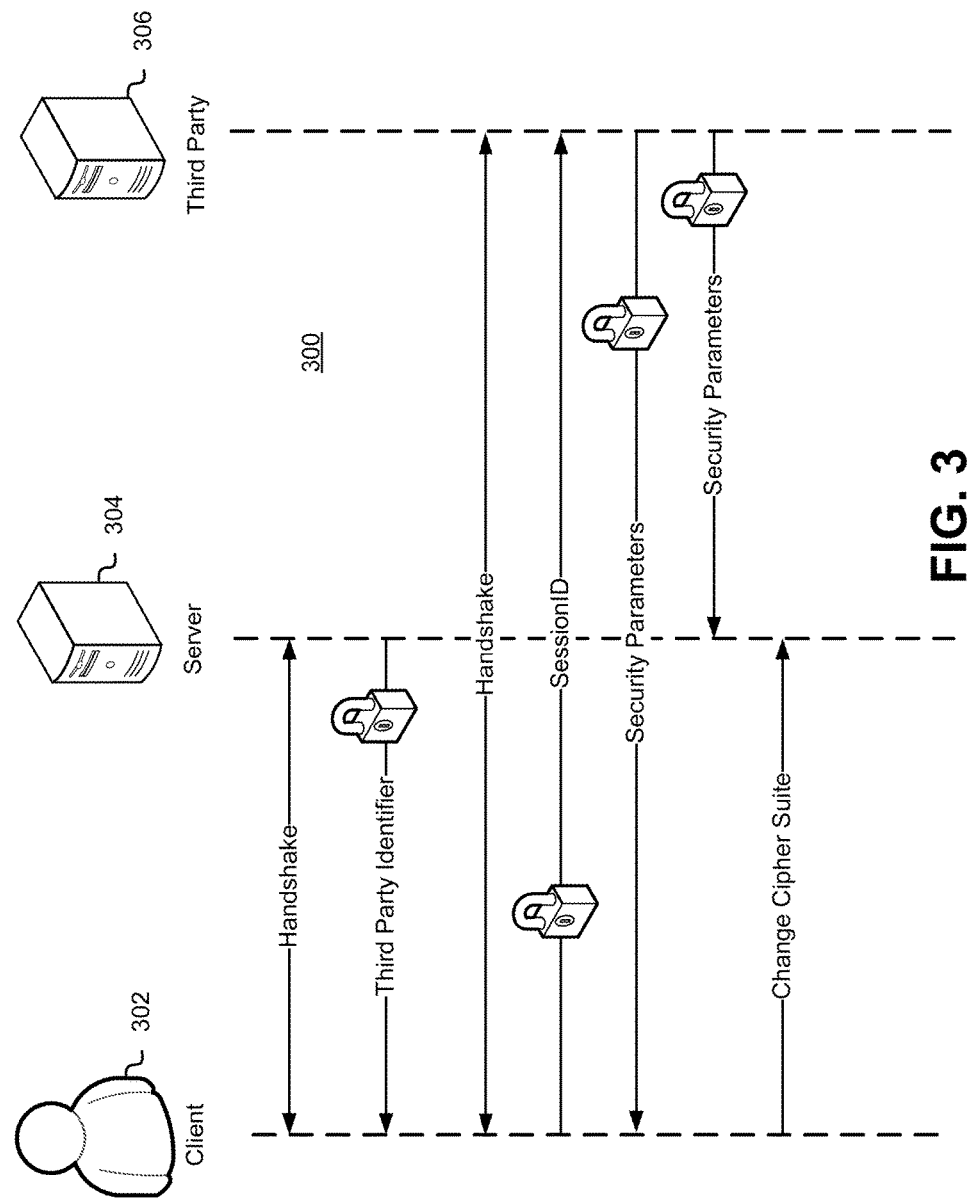
FIG. 3 shows a diagram illustrating a flow of communications in accordance with an embodiment.

FIG. 3 shows a diagram 300 illustrating a flow of information in accordance with various embodiments. As illustrated in FIG. 3, the diagram 300 represents communications among a client 302, a server 304, and a third party 306, which may be a client, server, and third party such as described above. In an embodiment, the client 302 completes a handshake process with the server 304 to establish a secure communications channel with the server 304. In some embodiments the client initiates the handshake process, such as by using a client hello message of the TLS protocol or by otherwise initiating a handshake of another protocol that utilizes handshakes. In the embodiment illustrated in FIG. 3, once a secure channel has been established, the server 304 selects a third party and transmits an identifier of the third party over the secure channel to the client 302. The third party identifier may be any information from which the client 302 is able to communicate with the third party 306. As noted, the third party identifier may be a URL, IP address, or other information that indicates to the client 302 how to contact the third party 306. In some examples, the third party identifier is an identifier that can be used as a reference to a pre-shared (as a secret) set of information about third parties. Credentials, a digital signature, or other information usable by the client 302 to present to the third party 306 to indicate authorization by the server 304 may also be provided with the third party identifier.

Once the client 302 has received the third party identifier from the server 304, the client 302 may perform a handshake process with the third party 306. Once the handshake process between the client 302 and the third party 306 has completed, the client 302 may transmit a session ID over a secure channel to the third party 306. The session ID may correspond to the secure channel that was established between the client 302 and the server 304, and in this example the session ID enables the third party 306 to distinguish security parameters for different client-server pairs that the third party 306 may be serving. Other information that is usable by the third party to distinguish security parameters for different client-server pairs may also be used. The session ID may be provided from the client 302 to the third party 306 in various ways in accordance with various embodiments. In some examples, a message formatted in accordance with a protocol used by the client 302 and the third parties 306 to communicate may identify the session ID in a field of the message. As another example, the client 302 may make an application programming interface request, such as a web services request, to the third party 306 where a parameter of the request may specify the session ID. Such a request or other message transmitted for the purpose of providing the session ID to the third party 306 may be authenticated using any manner rendering such messages cryptographically verifiable by the third party 306.

When the third party 306 has received the session ID, the third party 306 may determine security parameters and transmit those determined security parameters over a secure channel to the client 302. Third party 306 may determine the security parameters in various ways in accordance with various embodiments. For example, in some embodiments, the client 302, in addition to the session ID, transmits a list of cipher suites that the client 302 supports and the third party 306 may determine security parameters for the set of cipher suites. In another example, the client 302, in addition to the session ID, transmits to the third party 306 a set of cipher suites that the client 302 and the server 304 mutually support, which may be determined as the intersection of sets of cipher suites supported by the client 302 and the server 304 respectively. The client 302 may determine the intersection of these sets using a set of cipher suites received from the server 304 during the handshake process performed between the client 302 and the server 304. The set of cipher suites may be sent to the third party 306 to enable the third party 306 to determine a cipher suite to use and to determine parameters for that cipher suite, which may include a set of cryptographic keys to be used for communications using a secure channel in accordance with the selected cipher suite. The cipher suites transmitted to the third party 306 may be ranked either by the client 302 or by the third party 306 in accordance with cryptographic strength or other parameters such as computational efficiency. In other examples, the security parameters for the secure channel between the client 302 and third party 306 may be the security that is determined. In such examples and in general, the client may present cipher suites (or the third party may already have stored cipher suites) supported by the server 304. For example, the client may present to the third party the intersection of sets of cipher suites supported by both the client and the server so that the third party will determine security parameters for a cipher suite that is supported by both the client and the server.

As illustrated in FIG. 3, the third party 306 may also transmit security parameters to the server 304 which enable the client 302 and the server 304 to use their respective received security parameters to communicate with one another. In some examples, the server 304, when receiving a communication from the client 302, sends a request to the third party 306 for the security parameters where the request may specify the session ID that was provided to the third party 306 by the client 302. As another example, a distributed computer system may be configured such that third party 306 transmits the security parameters to the server 304 using a push notification. When the client has received the security parameters from the third party 306, the client 302 may transmit a change cipher suite message to the server 304 to indicate to the server 304 to communicate in accordance with the security parameters received from the third party 306. The change cipher suite message may be in accordance with the TLS protocol or may be a message formatted in accordance with an extension to the TLS protocol, or may be a message formulated in accordance with another protocol. Upon receipt of the change cipher suite message from the client 302 to the server 304, communications between the client 302 and the server 304 may be encrypted in accordance with the security parameters.

Numerous variations of the flow of information described in connection of FIG. 3 are considered as being within the scope of the present disclosure. For example, in some embodiments, the client 302 indicates to the server 304 the identity of the third party 306. The client 302 may, for example, indicate a device having short-range connectivity to the client 302 and/or otherwise may select a third party using one or more factors such as described above. As another example, the third party may not communicate with the server 304. The client 302 may encrypt the security parameters to a public key associated with the server 304 to enable the server 304 to decrypt the security parameters using a corresponding private key. As another example, operations illustrated as being performed by the client 302 may be performed by the server 304 and, similarly, operations illustrated as being performed by the server 304 may be performed by the client 302. In yet other examples, one of the client or server may contact the third party prior to establishing a first communications channel with the other of the client and server, thereby causing the client or server and the third party to determine security parameters before the other of the client and server contacts the third party to determine the security parameters.

Figure 4:
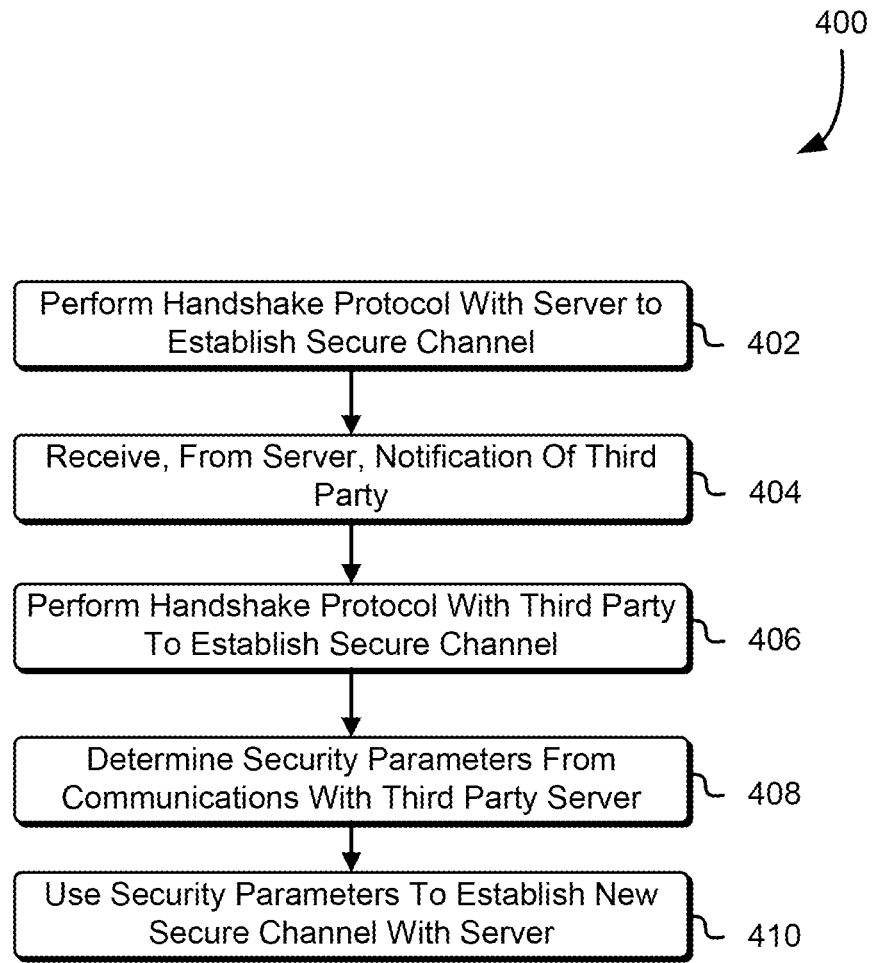
FIG. 4 shows an illustrative example of a process for establishing a secure channel in accordance with an embodiment.

FIG. 4 shows an illustrative example of a process 400 which may be used to implement various aspects of the present disclosure. The process 400 may be performed by any suitable computer system such as a client computer system as described above. In an embodiment, the process 400 includes performing 402 a handshake protocol (i.e., performing a handshake process in accordance with a handshake protocol) with a server to establish a secure channel. The handshake protocol may be, for example, a TLS or other handshake. After the secure channel has been established, the next communication or after having communicated over the secure channel for an amount of time, the process 400 may include receiving 404 from the server a notification of a third party. The notification may include information that enables the system performing the process 400 to communicate with the third party to obtain security parameters for another secure channel to be established with the server. For example, the notification of the third party may include a network address or a reference to a network address, such as a URL.

Once the notification of the third party has been received 404 and a system performing the process 400 is thereby able to communicate with the third party, the process 400 may include performing 406 a handshake protocol with the third party to establish a secure channel with the third party. The handshake protocol performed 406 with the third party may be the same handshake protocol performed 402 with the server or it may be a different protocol such as when the third party is a device associated with the system performing the process 400 that communicates with the system performing the process 400 using a different communications protocol.

Once the secure channel has been established 406, the process 400 may include determining 408 security parameters from communications with the third party server over the secure channel. The security parameters may be determined 408 in various ways in accordance with various embodiments. For example, in some embodiments the security parameters are the parameters negotiated with the third party as a result of performance 406 of the handshake protocol with the third party. As another example, the third party may transmit one or more messages that specify the security parameters. As noted above, the security parameters may indicate a cipher suite and a set of cryptographic keys or information usable to derive a set of cryptographic keys for communications over a secure channel in accordance with the security parameters.

Once the security parameters have been determined 408, the process 400 may include using 410 the security parameters to establish a new secure channel with the server. In some examples, using 410 the security parameters to establish a new secure channel with the server includes transmitting a message over the first secure channel that was established 402 where the message indicates to the server to switch to a cipher suite using the security parameters. The message may, for example, be a message configured to cause resumption of a session, such as a ClientHello message of TLS with a session identifier. The session identifier may be the same as used in the first secure communications channel that was established or a session identifier that is part of the security parameters (and, therefore, that the server also has obtained). In some embodiments a system performing the process 400 provides the server the security parameters in encrypted form, such as by encrypting the security parameters to a public key associated with the server, where the server has access to the corresponding private key. In other examples, as noted above, the server may obtain security parameters from the third party itself. Generally, once both the client and server have security parameters for communication over the new secure channel, the client and server may immediately begin communicating over the secure channel by encrypting messages in accordance with the security parameters and transmitting the encrypted messages.

Numerous variations of the process 400 are considered as being within the scope of the present disclosure, including variations discussed above. For example, in some embodiments a client does not establish a secure channel with the third party. For example, the client may be directly, i.e. physically, connected to the third party and/or the client may otherwise communicate with the third party in a manner such that messages between the client and the third party are unlikely to be compromised. As another example of a variation of the process 400 as considered as being within the scope of the present disclosure, as noted, roles of client and server may be reversed, including in connection with variations discussed above. Other variations are considered as being within the scope of the present disclosure.

Figure 5:
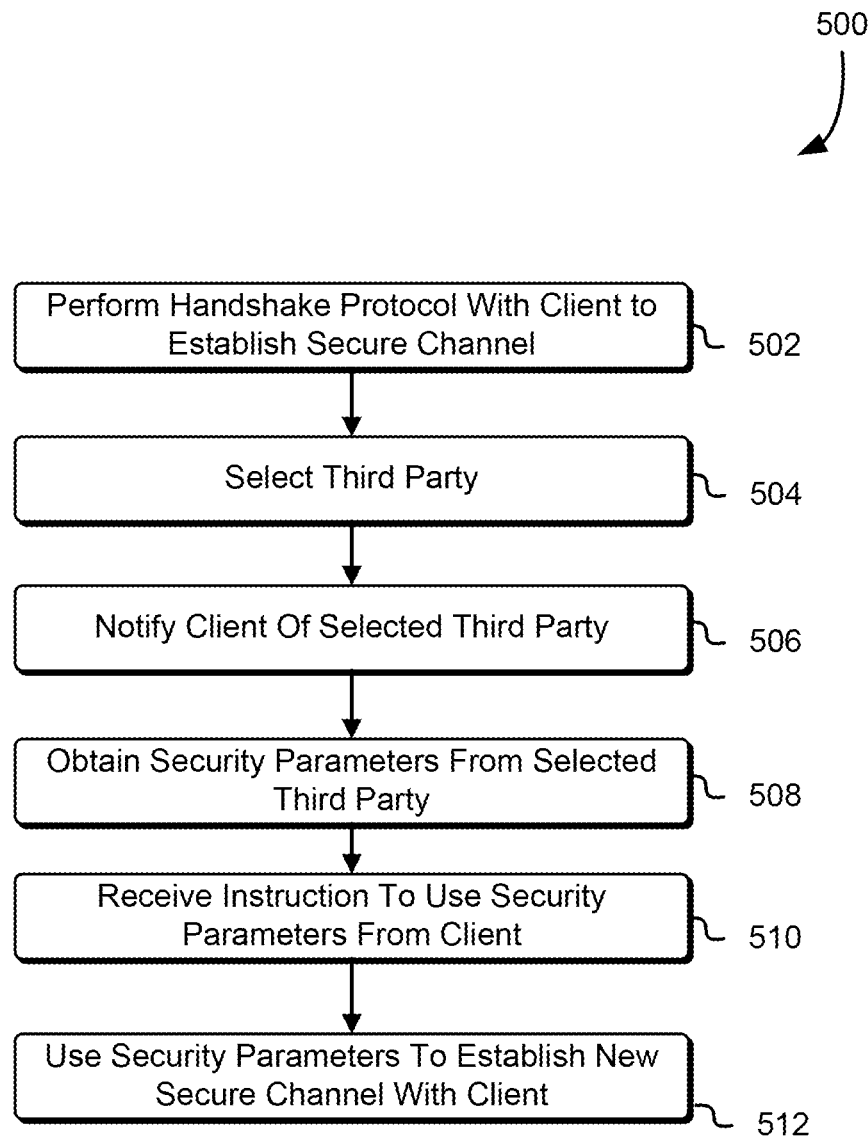
FIG. 5 shows an illustrative example of a process for establishing a secure communications channel in accordance with an embodiment.

FIG. 5 shows an illustrative example of a process 500 for establishing a secure channel in accordance with an embodiment. The process 500 may be performed by any suitable system such as by a server, as described above, although as discussed above operations described as being performed by a server may be performed by a client in some embodiments. In an embodiment, the process 500 includes performing 502 a handshake protocol with a client to establish a secure channel with the client. The handshake protocol performed 502 may be, for example, a TLS handshake or other handshake of another protocol, generally, any protocol by which parameters for establishment of a secure channel may be used.

The process 500 may also include selection 504 of a third party which may be from a plurality of third parties capable of acting as a third party (e.g., by being online and having an application that, when executed, causes the third party to perform operations as described herein) in accordance with the techniques described herein. As noted above, the third party may be selected in various ways in accordance with various embodiments. In some embodiments, the third party is selected as having been pre-selected by the client. In other words, the client may indicate a third party to use where the indication from the client may be received over the secure channel that was established. In another example, the client transmits a list of potential third parties and the process 500 includes selecting from the list provided by the client. In such examples, the list may be compared with a list of third parties with which the system performing the process 500 is able to communicate and the third party may be selected from the intersection of the two lists. Other ways of selecting 504, the third party may also be used; for example, as discussed above, geographic location of the client and/or the system performing the process 500 and/or the third party may be used to make the selection. Generally, any way by which a third party may be selected may be used in accordance with various embodiments.

It should be noted that while FIG. 5 shows selection of a third party to occur after establishment of the secure channel with the client in various embodiments, the third party may be selected at other times. For example, a third party may be selected during the handshake protocol that is performed with the client. As another example, the third party may be selected prior to the handshake protocol having been initiated. In some examples, a system performing the process 500 determines a next third party to use prior to the handshake with the client having been initiated.

Once the secure channel has been established 502 and the third party has been selected 504, the process may include notifying 506 the client of the selected third party. The notification 506 of the selected third party to the client may be communicated to the client over the secure channel that was established 502. The notification 506 to the client of the selected third party may be made in various ways in accordance with various embodiments. As noted, the notification may include a URL network address or other information identifying the selected server to the third party such as an identifier of the third party of which the client has accessible information such as a network address that enables the client to use the identifier to select the third party and use the network address to communicate with the third party.

The process 500 may also include obtaining security parameters from the selected third party. The selected third party may, for example, transmit the security parameters over a secure channel to the system performing the process 500. Once the security parameters have been obtained, the process 500 may include receiving 510 instructions from the client to use the security parameters. The received instruction may, for example, be in the form of a message transmitted over the secure channel.

Upon receipt of the instruction from the client, the security parameters may be used to establish a new secure channel with the client and to communicate over the secure channel. The secure channel may be established simply by receipt of the instruction or by acknowledgement to the client of the instruction in a message transmitted to the client. In addition to variations discussed above, variations of the process 500 are considered as being within the scope of the present disclosure. For example, FIG. 5 illustrates obtaining 508 security parameters from the selected third party. As noted above, however, the security parameters may be obtained in different ways such as from the client. As another example, instead of receiving an instruction to use the security parameters from the client, the process 500 may include transmitting an instruction to the client to switch to a channel using the security parameters.

Figure 6:
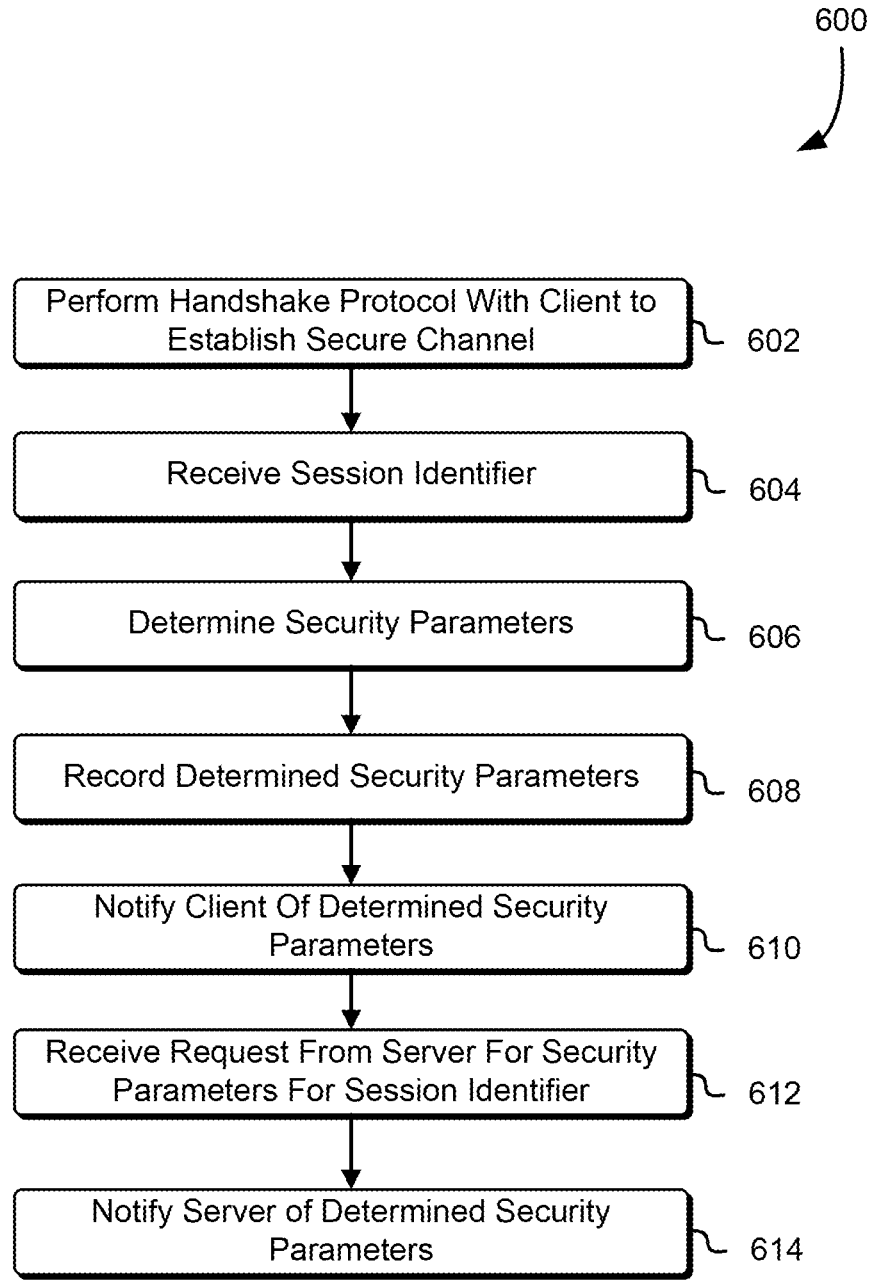
FIG. 6 shows an illustrative example of a process for providing security parameters for a secure channel in accordance with an embodiment.

FIG. 6 shows an illustrative example of a process 600 for providing security parameters in accordance with an embodiment. The process 600 may be performed by any suitable system such as by a third party discussed above. In an embodiment, the process 600 includes performing a handshake protocol with a client to establish a secure channel with the client. The handshake protocol that is performed 602 may be, for example, a TLS handshake or another handshake of another protocol.

Once a secure channel has been established 602 with the client, the process 600 may include receiving 604 a session identifier from the client. The session identifier received 604 from the client may indicate a secure channel established between the client and another computer system such as a server described above. The process 600 may also include determining 608 security parameters such as described above. The security parameters may include information about a cipher suite for a secure channel and cryptographic material for the secure channel where the cryptographic material may be a set of cryptographic keys and/or information usable to derive a set of cryptographic keys for the secure channel.

Once the security parameters have been determined 606, the process 600 may include recording 608 that determine security parameters. The determined security parameters may be recorded in various ways in accordance with various embodiments such as by storing the determined security parameters in a database in association with the session identifier that was received 604. The security parameters may be recorded in association with the session identifier in other ways such as in a cache accessible to a system performing the process 600 where the cache may expire items in the cache based on a length of time in the cache to enable the security parameters to expire and become unavailable after an amount of time, thereby preventing attacks where an attacker breaks a secure channel over which the client communicates and, as a result, attempts to obtain the security parameters from the system to perform the process 600.

Once the security parameters have been recorded 608, the client may be notified 610 of the determined 630 parameters. As noted, the client may be notified 610 of the security parameters in various ways in accordance with various embodiments. For example, the determined security parameters may be transmitted to the client in one or more messages that are encrypted in accordance with the secure channel that was established 602 with the client.

The process 600 may also include receiving 612 a request from the server for security parameters for the session identifier that was received 604. The request may be, for example, a web service request from the server to the system performing the process 600 which may implement a web service application programming interface (API).

Upon receiving 612 the request from the server for the security parameters for the session identifier, a system performing the process 600 may use the session identifier to look up the security parameters such as by querying a database or obtaining the session parameters from a cache and may notify 614 the server of the determined security parameters.

As with all processes described herein, numerous variations are considered as being within the scope of the present disclosure. For example, unless otherwise clear from context operations indicated as being performed in a particular order in the figures may, in some embodiments, be performed in a different order. As an illustrative example, security parameters may be determined 606 prior to having received the session identifier.

As another example, in a variation of the process 600, the client is not notified 610 of the determined security parameters because the client uses the security parameters that were determined during the handshake protocol that was performed 602 to establish the secure channel. As yet another example considered as being within the scope of the present disclosure, in some embodiments, a server does not transmit requests for the security parameters, but a system performing such a variation of the process 600 may send a push notification to the server. To enable such an embodiment, a communication from the client that includes a session identifier may also include an identifier such as a network address or other identifier of the server with which the client is to use the security parameters to establish a new secure channel.

As noted above, security parameters provided to the client may differ from those provided to the server such as when using a cipher suite by which client and server use different cryptographic material for the transmission of messages. As one example, a client and server may each have an encryption key and a decryption key where the client's encryption key differs from the server's encryption key and, the client's decryption key differs from the server's decryption key.

As discussed above, various embodiments of the present disclosure involve computer systems communicating with one another, changing the manner by which communications are securely communicated over time. For example, as discussed above, a client and server may establish a first communication channel, which may be used for an amount of time until the client and server switch to another communication channel, which may use a different cryptographic primitive or different parameters for the same cryptographic primitive. Various techniques of the present disclosure also involve more complex switching between cryptographic algorithms. Generally, communications between a client and a server and, generally, between two computer systems may switch the cryptographic algorithms being used in accordance with a cryptography algorithm hopping model such as described above.

Figure 7:
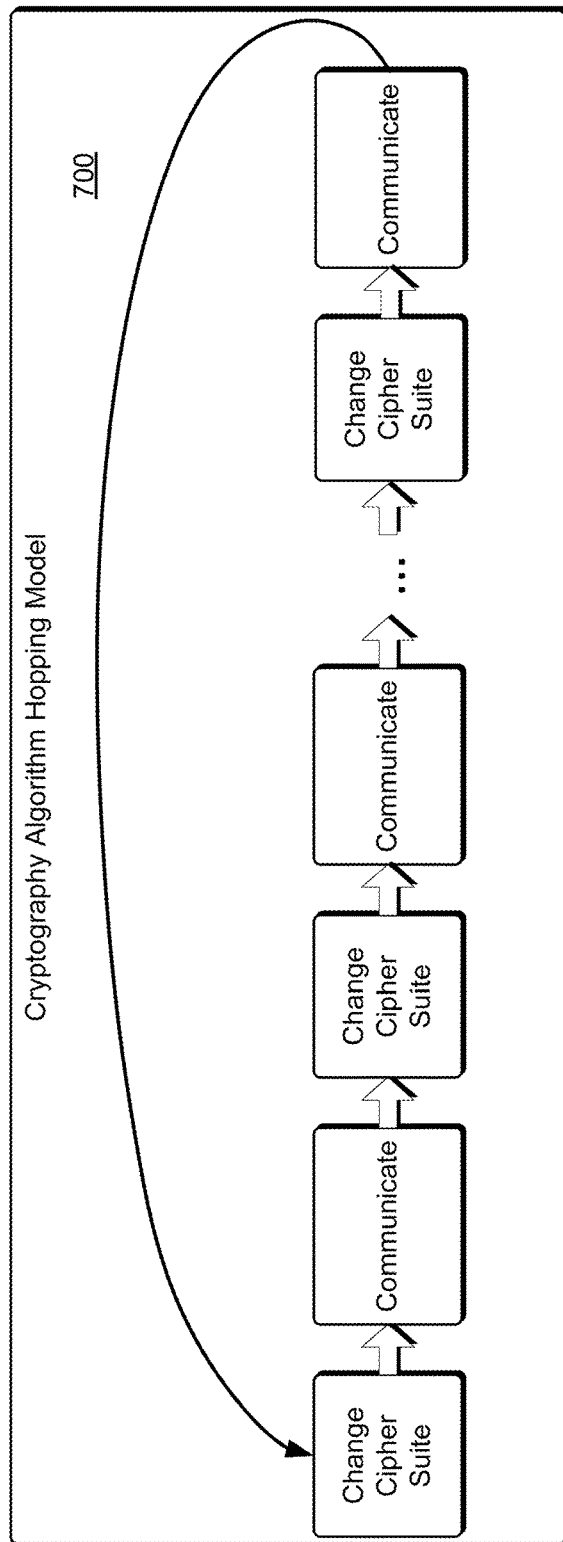
FIG. 7 shows a diagram illustrating a cryptography algorithm hopping model in accordance with an embodiment.

FIG. 7 shows an illustrative example of a cryptography algorithm hopping model 700 in accordance with an embodiment. As illustrated in FIG. 7, the cryptography algorithm hopping model 700 may indicate parameters for a cryptography algorithm hopping algorithm referred to more simply as a hopping algorithm. As illustrated in FIG. 7, the cryptography algorithm hopping model 700 may be configured such that the client and server communicate for an amount of time upon which a cipher suite change is made, whereby the client and server begin communicating using a different cryptographic algorithm or using different parameters of the same cryptographic algorithm.

As illustrated in FIG. 7, each time a cipher suite is changed the client and server may communicate over a secure channel until another change is made. As illustrated in FIG. 7, in some embodiments a cryptography algorithm hopping algorithm is cyclical in that after a number of changes among cipher suites, the order in which the changes occur repeats. It should be noted, however, in other embodiments, the changes between hopping algorithms may not repeat. As an illustrative example, a client and server may support 10 different cryptography algorithms. The 10 cryptography algorithms may be enumerated with the digits zero through nine. The digits of an irrational number, base 10, such as pi may be used to indicate the next cryptography algorithm to use from a current cryptology algorithm. For example, the digits 1415 may indicate that the client and server should start with a cryptography algorithm assigned at the number of one and then move to a cryptography algorithm assigned to number four, then back to a cryptography algorithm assigned to number one and then to a cryptography algorithm assigned to number five and such may continue along the digits of pi or another irrational number. Other variations are also considered as being within the scope of the present disclosure.

Figure 8:
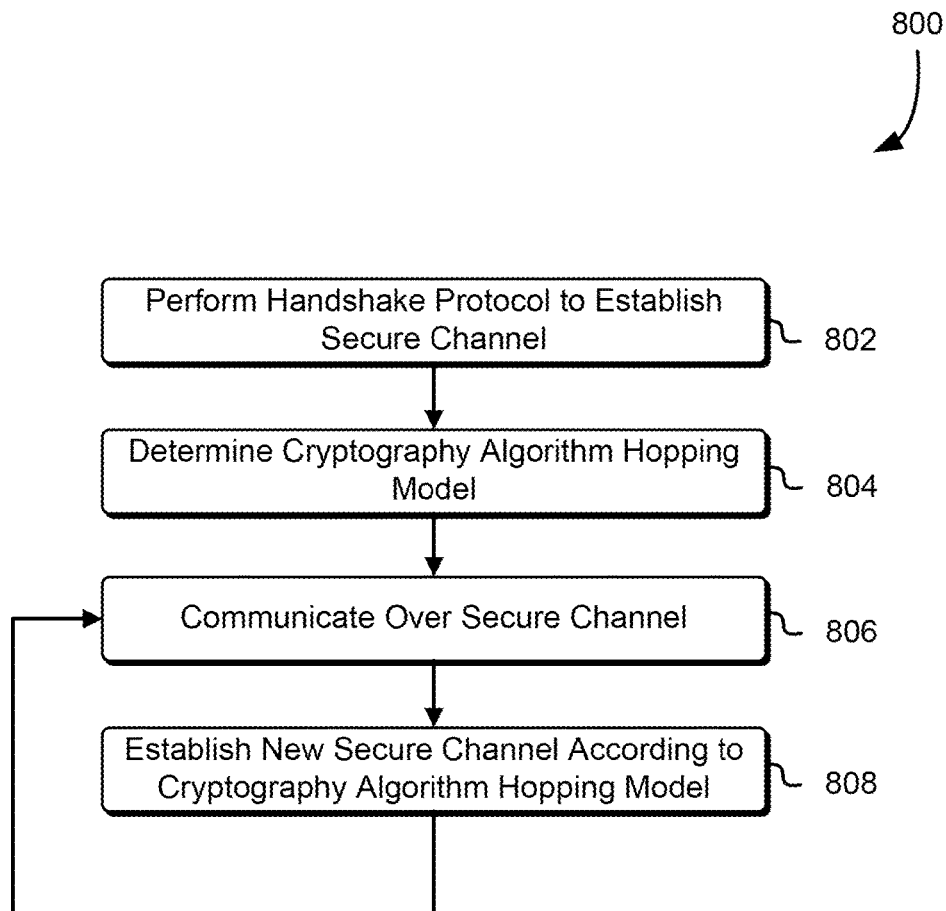
FIG. 8 shows an illustrative example of a process for establishing a secure communications channel in accordance with an embodiment.

FIG. 8 shows an illustrative example of a process 800 for communicating with another computer system in accordance with an embodiment. The process 800 may be performed by any suitable system such as a client computer system such as described above or a server computer system such as described above. Generally, any computer system that is configured to communicate with another computer system may be used. In an embodiment, the process 800 includes performing 802 a handshake protocol to establish a secure channel. The handshake protocol may be, for example, a TLS handshake or another handshake of another communication protocol.

A cryptography algorithm hopping model may also be determined 804. The cryptography algorithm hopping model may be determined 804 in various ways in accordance with various embodiments. For example, in some embodiments, the cryptography algorithm hopping model is shared with the other computer system offline or through a different communication channel. As another example, the cryptography algorithm hopping model may be negotiated between the system performing the process 800 and the other system over the secure channel that was established 802. As another example, during the handshake protocol that is performed, the cryptography algorithm hopping model can be negotiated using a model identifier that references a pre-shared model that is maintained as a secret between the system performing the process 800 and the other system. Negotiation of the cryptography algorithm hopping model may include additional communications over the secure channel that was established 802, although such communications are not illustrated in FIG. 8. As yet other examples considered as being within the scope of the present disclosure, a third party may provide to two computer systems a cryptography algorithm hopping model. The third party may be selected and communicated with such as described above. Generally, techniques for utilizing a third party for the purpose of obtaining security parameters may be adapted to obtain a cryptography algorithm hopping model in addition to or instead of a set of security parameters.

The process 800 may also include communicating 806 over the currently established secure channel. Communicating over the secured channel may include multiple transmissions and receipt of messages over the secure channel, although such operations are not illustrated in FIG. 8 for the purpose of clarity.

After an amount of time, a new secure channel may be established with the other system according to the cryptography algorithm hopping model. In some embodiments, the model includes the security parameters for the new secure channel, although in other embodiments the security parameters for the new secure channel are negotiated, such as using another handshake, each time a switch to a new secure channel is made. Once the new secure channel has been established 808, the system performing the process 800 may communicate over the secure channel 806, including transmitting and/or receiving messages over the new secure channel that was established 808. As illustrated in FIG. 8, a portion of the process 800 may repeat in accordance with the cryptography algorithm hopping model while the system performing the process 800 communicates with the other system.

The way by which a new secure channel is established 808 may vary in accordance with various embodiments. As noted in some examples, the cryptography algorithm hopping model indicates security parameters to be used for the new channel. As another example, use of a cryptography algorithm hopping model may be combined with the techniques described above utilizing a third party. For example, in accordance with the model when it is time to switch cipher suites, the process 800 may include communications with a third party to determine the new security parameters. The other computer system with which the secure channel was established 802 may also obtain information indicating the third party to enable to the other system to obtain the security parameters, as well, such as described above.

In some examples, the third party or, generally, the entity that determines and provides the cryptography algorithm hopping model provides, in the model, the security parameters for the cryptography algorithms specified in the model. In other examples, the process 800 may include selecting a new third party for establishment of a new secure channel when establishment of a new secure channel is timely in accordance with the cryptography algorithm hopping model. A single third party may be used throughout implementation of the cryptography algorithm hopping model or different third parties may be used at different times during the communications of the system performing the process 800 and the other system with which the communication channel was established 802.

Figure 9:
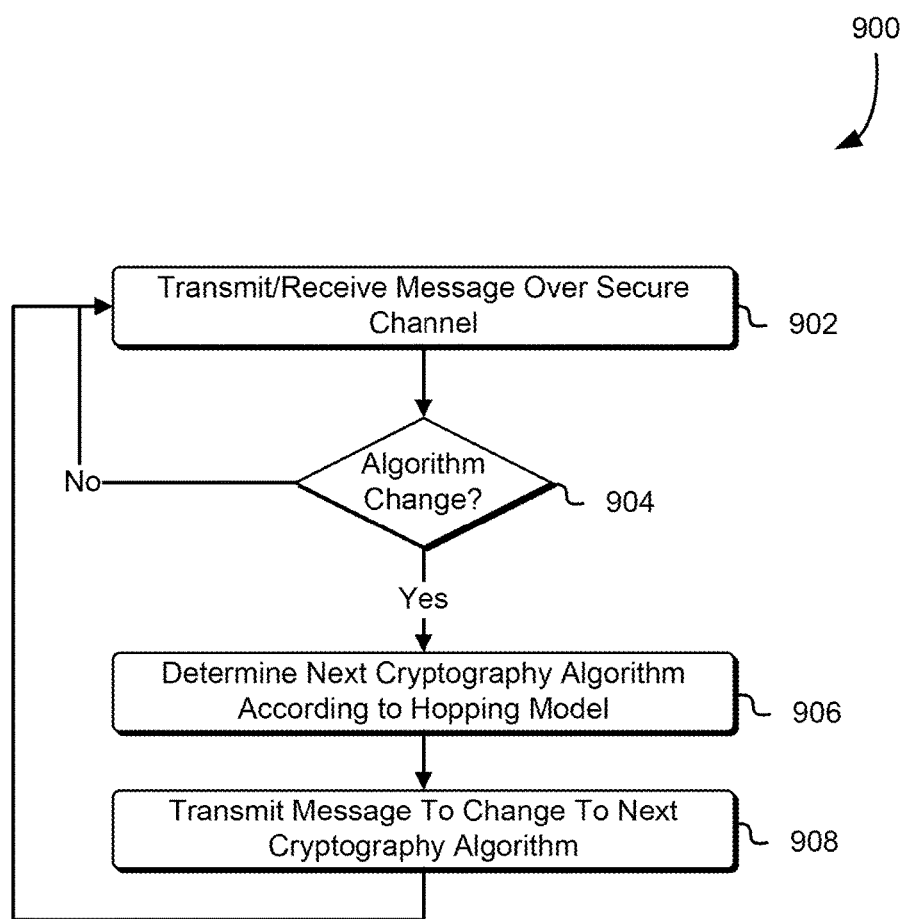
FIG. 9 shows an illustrative example of a process for communicating in accordance with an embodiment.

Numerous variations, including variations described above, in connection with use of a third party are considered as being within the scope of the present disclosure. FIG. 9 shows an illustrative example of a process 900 for implementing a cryptography algorithm hopping model in accordance with an embodiment. The process 900 may be performed by any suitable system such as a system performing the process 800 described above, which may be a client or server computer system.

Turning to the specifics of the embodiment illustrated in FIG. 9, in some examples the process 900 includes transmitting or receiving 902 a message over the secure channel. A determination may be made whether to change cryptographic algorithms. It should be noted that a cryptographic algorithm may be changed by changing the security parameters for a cryptographic primitive being used or by changing the cryptographic primitive that is used. It should be noted, however, that in some embodiments changing cryptographic algorithms is limited to changing cryptographic primitives and use of the same cryptographic primitive with different parameters may not be used.

A determination may be made 904 whether to change cryptographic algorithms. The determination may be made in various ways in accordance with various embodiments. In some examples, the determination is made 904 based on an amount of data that has been transmitted and/or received since a last change of cryptographic algorithms. The amount of data may be measured in various ways, such as an amount of encrypted data measured in bytes, blocks, or a number of encrypted messages transmitted. For example, as noted, a counter may be maintained by the system performing the process 900 and the cryptography algorithm hopping model may indicate that a change is to be made after a certain number of messages that have been transmitted and/or received. The counter may also be maintained in the messages themselves such as by an enumeration of messages used in a record protocol such as the record protocol of TOS.

In some examples, the determination whether to change cryptographic algorithms may be made 904 probabilistically (stochastically). A random number, for example, may be generated and conditions may be placed on the random number such that if the random number satisfies the conditions, a change is made. In such examples, a notification may be made to the other system with which the secure channel is established to notify the other system of the change. Other ways by which the determination may be made 904 are also considered as being within the scope of the present disclosure.

When it is determined 904 to change cryptography algorithms, the process 900 may include determining 906 and next cryptography algorithm according to the hopping model. A message may then be transmitted 908 to the other system with which the secure channel is established to indicate to the other system to change to the next cryptography algorithm. As noted, changes in the next cryptography algorithm may include simply using pre-obtained security parameters to switch to a new secure channel, may include negotiating security parameters for this new secure channel, and/or may include communicating with a third party to obtain security parameters for the new secure channel. In some embodiments, the session renegotiation feature of TLS is used as a mechanism to cause a change to a new cryptography algorithm.

Variations of the process 900 are considered as being within the scope of the present disclosure. For example, as discussed above, the cryptography algorithm hopping model may indicate the changes of cryptographic algorithms at fixed time intervals or variable time intervals. Accordingly, the process 900 may include monitoring for expiration of a time for a current communication channel. Thus, a determination 904 whether to change algorithms may be made independently of a remainder of the process 900.

As another example, clock synchronization and/or other techniques may be used to avoid transmission of a message to change the next cryptography algorithm. For example, two systems communicating with one another with a synced clock may simply change to the next cryptography algorithm at the right time. On some embodiments clocks do not need to be synced and transmission of messages from one system to the other when both systems are using different cryptography algorithms may simply result in errors which may be resolved when the system lagging behind changes to the new cryptography algorithm. Other variations are also considered as being within the scope of the present disclosure.

In some embodiments, the techniques of the present disclosure and, generally, other techniques are utilized to mitigate the effects of suspected denial of service (DoS) attacks, such as distributed denial of service (DDoS) attacks. In some examples, when a client is suspected as participating in a DoS attack, a server may adjust the cipher suites it purports to support to result in a negotiation of a secure communications channel that statistically requires the use of more computational resources from the client than from the server. Example cipher suites with such properties are DHE-RSA-AES256-SHA (a Diffie-Hellman key exchange, RSA for authentication, the Advanced Encryption Standard 256 for encryption and the secure hash algorithm for message authentication) and DHE-DSS-AES256-SHA (the same cipher suite, but with the digital signature standard for authentication). Causing negotiation of a cipher suite that is computationally more efficient for the server than for the client may be used on its own, with techniques that utilize a third party (e.g., with the server communicating with the third party to indicate that it should cause security parameters for such a cipher suite) to be determined, and with a cryptography hopping algorithm models.

The computational efficiency that causes the client to, statistically, use more computational resources than the server may be a characteristic of the handshake and/or for the individual cryptographic primitives (e.g., an encryption algorithm). In this manner, the effects of a DoS attack may be mitigated by selectively causing suspect clients to perform more work than the server, thereby reducing the ability of a client to harmfully affect operation of the server. Further, an additional technical advantage is achieved in that a client misidentified as suspect (e.g., suspect as participating in a DoS attack) will still be able to access functionality of a service associated with the server. In some examples, the delay achieved is significant from a computational perspective, but imperceptible or otherwise insignificant from the perspective of a human operator (e.g., website user).

As discussed, numerous variations utilize symmetric and/or asymmetric cryptographic primitives (algorithms). Symmetric key algorithms may include various schemes for performing cryptographic operations on data including block ciphers, stream ciphers and digital signature schemes. Example symmetric key algorithms include the advanced encryption standard (AES), the data encryption standard (DES), triple DES (3DES), Serpent, Twofish, blowfish, CASTS, RC4 and the international data encryption algorithm (IDEA). Symmetric key algorithms may also include those used to generate output of one way functions and include algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include those that utilize the Diffie-Hellman key exchange protocol (an example cryptographic key exchange process), the digital signature standard (DSS), the digital signature algorithm, the ElGamal algorithm, various elliptic curve algorithms, password-authenticated key agreement techniques, the pallier cryptosystem, the RSA encryption algorithm (PKCS#1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme, and the ECQV implicit certificate scheme. Other algorithms and combinations of algorithms are also considered as being within the scope of the present disclosure and the above is not intended to be an exhaustive list.

Example, cryptographic algorithms include block ciphers and the various modes that utilize initialization vectors, such as the cipher-block chaining (CBC) mode, propagating cipher-block chaining (PCBC) mode, cipher feedback mode (CFB), output feedback (OFB) mode, counter (CTR) mode, and other modes, such as authenticated encryption modes such as eXtended Ciphertext Block Chaining (XCBC) mode, Integrity Aware CBC (IACBC) mode, Integrity Aware Parallelizable (IAPM) mode, Offset Codebook (OCB) mode, EAX and EAX Prime modes, Carter-Wegman+CTR (CWC) mode, Counter with CBC-MAC (CCM) mode, and Galois/Counter (GCM) mode.

Figure 10:
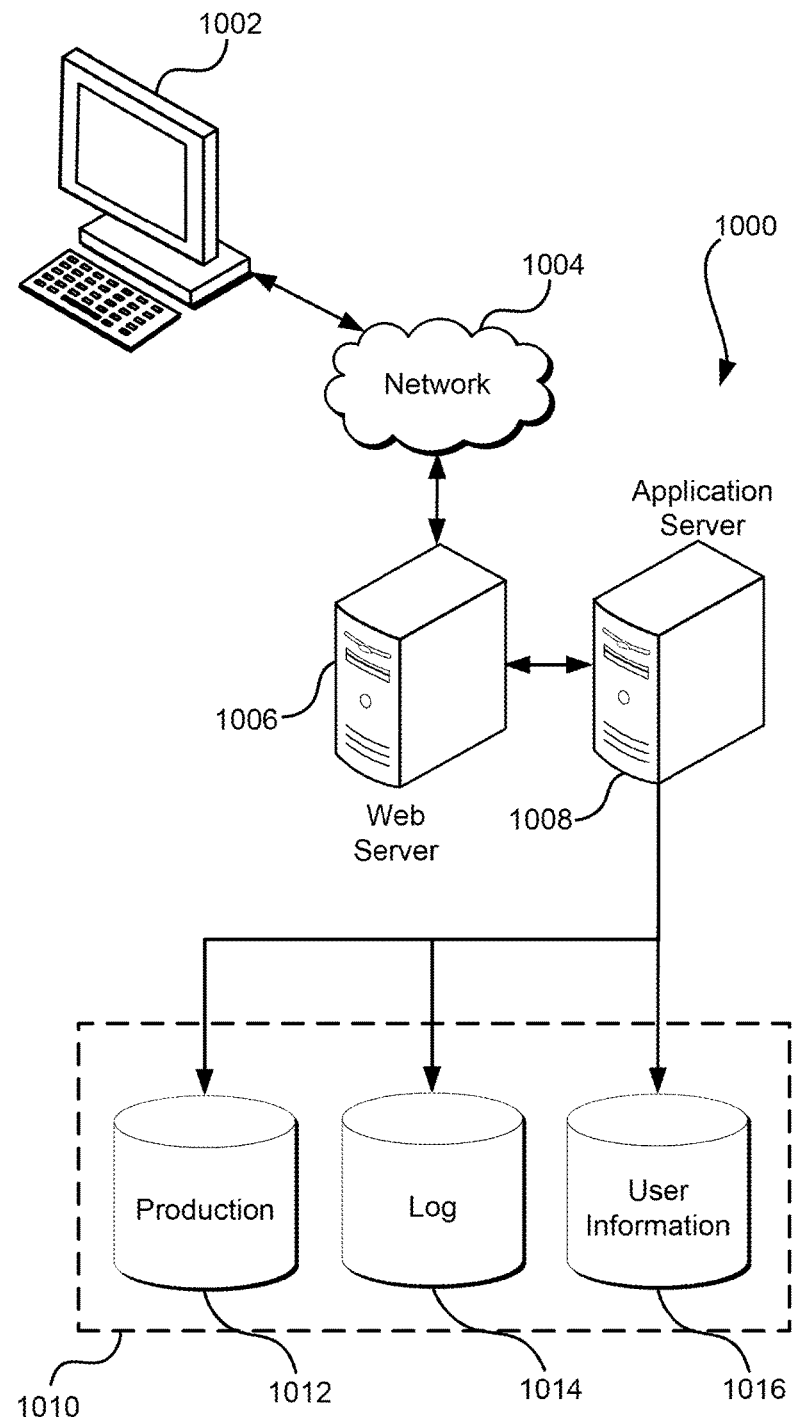
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1002 and the application server 1008, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

Embodiments of the disclosure can be described in view of the following clauses:

Clause 1. A computer-implemented method, comprising:
under the control of one or more computer systems configured with executable instructions,
performing a handshake process to establish a first secure communications channel with a first computer system;
determining a second computer system;
transmitting, to the first computer system and over the established first secure communications channel, an indication of the second computer system;
receiving, over a second secure communications channel established with the second computer system, a set of security parameters defining a third communications channel; and
using the set of security parameters to communicate with the first computer system over the third communications channel.

Clause 2. The computer-implemented method of clause 1, wherein the handshake is a Transport Layer Security handshake.

Clause 3. The computer-implemented method of clause 1 or 2, wherein the indication of the second computer system comprises a network address of the second computer system or a reference to the network address of the second computer system.

Clause 4. The computer-implemented method of any of clauses 1 to 3, wherein the set of security parameters comprise cryptographic material for encrypting messages to be decryptable by the first computer system, the cryptographic material comprising an encryption key or information from which the encryption key is derivable.

Clause 5. The computer-implemented method of any of clauses 1 to 4, wherein determining the second computer system comprises selecting, based at least in part on a location of the first computer system, the second computer system from a plurality of second computer systems individually operable to provide the security parameters.

Clause 6. A system, comprising:
at least one computing device configured to provide one or more services, the one or more services configured to:
determine a set of security parameters for establishment of a secure communications channel;
store the determined set of security parameters in association with a pairing of a first computer system and a second computer system;
receive, a request from the first computer system for the determined set of security parameters, the request indicating the pairing of the first computer system and the second computer system; and
provide, to the first computer system, at least a subset of the determined set of security parameters.

Clause 7. The system of clause 6, wherein the one or more services are further configured to store the determined set of security parameters in association with the pairing of the first computer system and second computer system by storing the determined set of security parameters in association with a session identifier of a session established between the first computer system and the second computer system.

Clause 8. The system of clause 6 or 7, wherein the one or more services are further configured to provide at least a second subset of the determined set of security parameters to the second computer system.

Clause 9. The system of clause 8, wherein the at least the subset of the set of security parameters enables the first computer system to communicate to the second computer system over the secure communications channel without performing a cryptographic key exchange process with the second computer system to establish the secure communications channel.

Clause 10. The system of any of clauses 6 to 9, wherein:
the secure communications channel is a first secure communications channel; and
the one or more services are further configured to perform a handshake process to establish a second secure communications channel with the first computer system; and
the request is received over the second secure communications channel.

Clause 11. The system of clause 10, wherein:
the at least the subset is a first subset; and
the one or more services are further configured to maintain a third secure communications channel with the second computer system to provide the second computer system at least a second subset of the set of security parameters.

Clause 12. The system of clause 11, wherein the first subset is different from the at least the second subset.

Clause 13. A non-transitory computer-readable storage medium having stored thereon executable instructions that, when executed by one or more processors of a first computer system, cause the first computer system to at least:
establish a first secure communications channel with a second computer system;
communicate over the established first secure communications channel to determine a third computer system;
obtain, from the third computer system, a set of security parameters for a second secure communications channel; and
use the obtained set of security parameters to communicate with the second computer system over the second secure communications channel.

Clause 14. The non-transitory computer-readable storage medium of clause 13, wherein:
the instructions further comprise instructions that, when executed by the one or more processors, cause the computer system to establish a third secure communications channel with the third computer system; and
the set of security parameters is obtained over the third secure communications channel.

Clause 15. The non-transitory computer-readable storage medium of clause 13 or 14, wherein the instructions that cause the first computer system to use the obtained set of security parameters, when executed by the one or more processors, cause the first computer system to encrypt a message to the second computer system using a cryptographic key determined from the obtained set of security parameters.

Clause 16. The non-transitory computer-readable storage medium of clause 15, wherein the instructions further include instructions that, when executed by the one or more processors, cause the first computer system to determine the cryptographic key from the obtained set of security parameters without performing a cryptographic key exchange process involving the second computer system.

Clause 17. The non-transitory computer-readable storage medium of any of clauses 13 to 16, wherein the first secure communications channel and the second secure communications channel utilize different cryptographic primitives for encryption.

Clause 18. The non-transitory computer-readable storage medium of any of clauses 13 to 17, wherein the instructions further include instructions that, when executed by the one or more processors, cause the first computer system to negotiate selection of the third computer system from a plurality of computer systems.

Clause 19. The non-transitory computer-readable storage medium of any of clauses 13 to 18, wherein:
the instructions further include instructions that, when executed by the one or more processors, cause the first computer system to receive, from the second computer system over the first secure channel, information specifying the third computer system; and
the instructions that cause the first computer system to obtain the set of security parameters, when executed by the one or more processors, cause the first computer system to request the set of security parameters from the third computer system as a result of the information specifying the third computer system.

Clause 20. The non-transitory computer-readable storage medium of clause 19, wherein:
the instructions that cause the first computer system to obtain the set of security parameters, when executed by the one or more processors, cause the first computer system to perform a handshake process with the third computer system to establish a third secure communications channel; and
the instructions that cause the first computer system to request the set of security parameters, when executed by the one or more processors, cause the first computer system to transmit a request for the set of security parameters over the third secure channel.

Clause 21. A computer-implemented method, comprising:
under the control of a first computer system configured with executable instructions,
obtaining a cryptography algorithm hopping model that specifies a plurality of cryptography algorithms and information sufficient to determine a sequence of the plurality of cryptography algorithms and to determine when to switch from a cryptography algorithm in the sequence to a next cryptography algorithm in the sequence;
establishing a first secure communications channel with a second computer system, the secure communications channel associated with a first cryptography algorithm of the plurality of cryptography algorithms;
communicating with the second computer system over the established first secure communications channel by transmitting messages that are encrypted using the first cryptography algorithm;
using the obtained cryptography algorithm hopping model to determine when to switch to a second cryptography algorithm, the second cryptography algorithm being a next in the sequence relative to the first cryptography algorithm; and
communicating with the second computer system over a second secure communications channel by transmitting messages that are encrypted using the second cryptography algorithm.

Clause 22. The computer-implemented method of clause 21, wherein the cryptography algorithm hopping model is pre-shared as a secret with the second computer system prior to establishing the first secure communications channel.

Clause 23. The computer-implemented method of clause 21 or 22, further comprising negotiating the cryptography algorithm hopping model with the second computer system over the established first secure communications channel.

Clause 24. The computer-implemented method of any of clauses 21 to 23, wherein using the obtained cryptography algorithm hopping model to determine when to switch to the second cryptography algorithm includes determining an amount of data transferred over the established first secure communications channel and wherein a determination whether to switch to the second cryptography algorithm depends on the determined amount of data.

Clause 25. A system, comprising:
at least one computing device configured to implement one or more services, wherein the one or more services are configured to:
determine information sufficient to determine when to switch from a cryptography algorithm in a sequence of a plurality of cryptography algorithms to a next cryptography algorithm in the sequence of the plurality of cryptography algorithms; and
as part of communicating with a second system using encrypted messages, switch from a first cryptography algorithm to a second cryptography algorithm in accordance with the determined information.

Clause 26. The system of clause 25, wherein the determined information is further sufficient to determine the sequence.

Clause 27. The system of clause 25 or 26, wherein the one or more services are further configured to negotiate the information with the second system during a handshake process with the second system.

Clause 28. The system of clause 27, wherein the handshake process results in the plurality of cryptography algorithms being mutually supported by both the system and the second system.

Clause 29. The system of any of clauses 25 to 28, wherein the information defines a set of time intervals for switching cryptography algorithms in the sequence.

Clause 30. The system of clause 29, wherein the time intervals have equal length.

Clause 31. The system of any of clauses 25 to 30, wherein the one or more services are further configured to use the information to switch from the first cryptography algorithm to the second cryptography algorithm without performing a handshake process with the second system.

Clause 32. The system of any of clauses 25 to 31, wherein the one or more services are further configured to:
establish a secure communications channel with the second system;

communicate with the second system to determine a third system; and obtain the information from the third system.

Clause 33. A non-transitory computer-readable storage medium having stored thereon executable instructions that, when executed by one or more processors of a computer system, cause the computer system to at least:

encrypt a first message to a second computer system using a first cryptography algorithm;

after transmitting the first message to the second computer system, use a cryptography algorithm hopping model to determine to switch to a second cryptography algorithm; and after determining to switch to the second cryptography algorithm, encrypt a second message to the second computer system using a second cryptography algorithm different from the first cryptography algorithm.

Clause 34. The non-transitory computer-readable storage medium of clause 33, wherein the instructions further comprise instructions that, when executed by the one or more processors, cause the computer system to:

perform a handshake process with the second computer system to establish a secure communications channel; and obtain the cryptography algorithm hopping model over the established secure communications channel.

Clause 35. The non-transitory computer-readable storage medium of clause 33 or 34, wherein the instructions further comprise instructions that, when executed by the one or more processors, cause the computer system to:

receive information indicating a set of cryptography algorithms supported by the second computer system; and determine the cryptography hopping algorithm based at least in part on the received information.

Clause 36. The non-transitory computer-readable storage medium of clause 35, wherein the instructions further include instructions that, when executed by the one or more processors, cause the computer system to provide the determined cryptography hopping algorithm to the second computer system.

Clause 37. The non-transitory computer-readable storage medium of any of clauses 33 to 36, wherein the instructions further include instructions that, when executed by the one or more processors, cause the computer system to:

provide, to the second computer system, information indicating a set of cryptography algorithms supported by the computer system; and receive the cryptography algorithm hopping model from the second computer system.

Clause 38. The non-transitory computer-readable storage medium of any of clauses 33 to 37, wherein the instructions further include instructions that, when executed by the one or more processors, cause the computer system to:

determine a third computer system; and receive the cryptography algorithm hopping model from the determined third system.

Clause 39. The non-transitory computer-readable storage medium of clause 38, wherein the instructions further include instructions that, when executed by the one or more processors, cause the computer system to specify the third computer system to the second computer system.

Clause 40. The non-transitory computer-readable storage medium of clause 38, wherein the instructions further include instructions that, when executed by the one or more processors, cause the computer system to receive information specifying the third computer system from the second computer system.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
    obtaining, at a first computing device, a cryptography algorithm hopping model that specifies a plurality of cryptography algorithms and information sufficient to determine a sequence of the plurality of cryptography algorithms and to determine when to switch from a cryptography algorithm in the sequence to a next cryptography algorithm in the sequence;
    establishing a first secure communications channel by performing a handshake process with a second computing device, the first secure communications channel associated with a first cryptography algorithm of the plurality of cryptography algorithms;
    receiving, from a third computing device during the handshake process, a cipher suite to use from a set of cipher suites received from the second computing device, the cipher suite containing a second cryptography algorithm;
    communicating with the second computing device over the first secure communications channel by transmitting messages that are encrypted using the first cryptography algorithm;
    using the cryptography algorithm hopping model to determine when to switch to the second cryptography algorithm, the second cryptography algorithm being a next in the sequence relative to the first cryptography algorithm; and
    communicating with the second computing device over a second secure communications channel by transmitting messages that are encrypted using the second cryptography algorithm.

2. The computer-implemented method of claim 1, wherein the cryptography algorithm hopping model is pre-shared as a secret with the second computing device prior to establishing the first secure communications channel.

3. The computer-implemented method of claim 1, further comprising negotiating the cryptography algorithm hopping model with the second computing device over the first secure communications channel.

4. The computer-implemented method of claim 1, wherein using the cryptography algorithm hopping model to determine when to switch to the second cryptography algorithm includes determining an amount of data transferred over the first secure communications channel and wherein a determination whether to switch to the second cryptography algorithm depends on the amount of data.

5. A system, comprising:
    a first computing device including memory and a processor, wherein the processor is configured to implement one or more services, wherein the one or more services:
        perform a handshake process with a second computing device to establish a secure communications channel;
        receive, from a third computing device during the handshake process, a cipher suite to use from a set of cipher suites received from the second computing device;
        determine information sufficient to determine when to switch from a cryptography algorithm in a sequence of a plurality of cryptography algorithms to a next cryptography algorithm in the sequence of the plurality of cryptography algorithms, the cipher suite containing the next cryptography algorithm; and
        as part of communicating with the second computing device using encrypted messages, switch from a first cryptography algorithm to a second cryptography algorithm in accordance with the information.

6. The system of claim 5, wherein the information is further sufficient to determine the sequence.

7. The system of claim 5, wherein the one or more services are further configured to negotiate the information with the second computing device during a handshake process with the second computing device.

8. The system of claim 7, wherein the handshake process results in the plurality of cryptography algorithms being mutually supported by both the first computing device and the second computing device.

9. The system of claim 5, wherein the information defines a set of time intervals for switching cryptography algorithms in the sequence.

10. The system of claim 9, wherein the set of time intervals have equal length.

11. The system of claim 5, wherein the one or more services are further configured to use the information to switch from the first cryptography algorithm to the second cryptography algorithm without performing a handshake process with the second computing device.

12. The system of claim 5, wherein the one or more services are further configured to:
    establish a secure communications channel with the second computing device;
    communicate with the second computing device to determine the third computing device; and
    obtain the information from the third computing device.

13. A non-transitory computer-readable storage medium having stored thereon executable instructions that, as a result of one or more processors of a first computing device executing, cause the first computing device to:
    perform a handshake process with a second computing device to establish a secure communications channel;
    encrypt a first message to the second computing device using a first cryptography algorithm;
    receive, from a third computing device during the handshake process, a cipher suite to use from a set of cipher suites received from the second computing device the cipher suite containing a second cryptography algorithm;

after transmitting the first message to the second computing device, use a cryptography algorithm hopping model to determine to switch to the second cryptography algorithm; and after determining to switch to the second cryptography algorithm, encrypt a second message to the second computing device using a second cryptography algorithm different from the first cryptography algorithm.

14. The non-transitory computer-readable storage medium of claim 13, wherein the executable instructions further comprise instructions that, as a result of the one or more processors executing, cause the first computing device to:

obtain the cryptography algorithm hopping model over the secure communications channel.

15. The non-transitory computer-readable storage medium of claim 13, wherein the executable instructions further comprise instructions that, as a result of the one or more processors executing, cause the first computing device to:

receive information indicating a set of cryptography algorithms supported by the second computing device; and determine the first cryptography algorithm based at least in part on the information.

16. The non-transitory computer-readable storage medium of claim 15, wherein the executable instructions further include instructions that, as a result of the one or more processors executing, cause the first computing device to provide the first cryptography algorithm to the second computing device.

17. The non-transitory computer-readable storage medium of claim 13, wherein the executable instructions further include instructions that, as a result of the one or more processors executing, cause the first computing device to:

provide, to the second computing device, information indicating a set of cryptography algorithms supported by the first computing device; and receive the cryptography algorithm hopping model from the second computing device.

18. The non-transitory computer-readable storage medium of claim 13, wherein the executable instructions further include instructions that, as a result of the one or more processors executing, cause the first computing device to:

determine the third computing device; and receive the cryptography algorithm hopping model from the third computing device.

19. The non-transitory computer-readable storage medium of claim 18, wherein the executable instructions further include instructions that, as a result of the one or more processors executing, cause the first computing device to specify the third computing device to the second computing device.

20. The non-transitory computer-readable storage medium of claim 18, wherein the executable instructions further include instructions that, as a result of the one or more processors executing, cause the first computing device to receive information specifying the third computing device from the second computing device.

* * * * *